United States Patent

Evertz

[11] 3,891,821
[45] June 24, 1975

[54] METHOD FOR REPAIRING IRON MOLDS USED IN STEEL MAKING, CASTING PLATES IN IRON MOLDS AND OTHER OBJECTS MADE OF CAST IRON

[76] Inventor: Egon Evertz, Vorlander Strasse 23, 565 Solingen, Germany

[22] Filed: May 24, 1973

[21] Appl. No.: 363,407

[30] Foreign Application Priority Data
May 24, 1972 Canada .............................. 142869

[52] U.S. Cl. ..................... 219/76; 29/402; 164/92; 164/96; 219/137
[51] Int. Cl. ........................ B23k 9/04; B22d 19/10
[58] Field of Search ........ 219/137, 76; 29/401, 402; 164/92, 96, 98

[56] References Cited
UNITED STATES PATENTS
2,024,992  12/1935  Wissler et al. .................... 219/76 X
2,494,970  1/1950  Shea ................................. 219/76 X FOREIGN PATENTS OR APPLICATIONS
702,715  1/1965  Canada ............................... 219/76

Primary Examiner—J. V. Truhe
Assistant Examiner—Clifford C. Shaw
Attorney, Agent, or Firm—Holman & Stern

[57] ABSTRACT

A method of repairing damaged parts of cast iron objects wherein impurities adhering to the surface of said damaged parts are first removed after which layers of molten material are applied successively to the damaged area by means of current carrying electrodes, at least the first of such layers comprising a layer of steel which is formed from a welding steel electrode and at least the last layer of such material comprising a gray cast iron layer formed from a gray cast iron electrode.

7 Claims, 2 Drawing Figures

1

METHOD FOR REPAIRING IRON MOLDS USED IN STEEL MAKING, CASTING PLATES IN IRON MOLDS AND OTHER OBJECTS MADE OF CAST IRON

BACKGROUND OF THE INVENTION

The invention relates to a method of repairing damaged parts of iron molds which are used in steelmaking, in casting plates in iron molds and in other objects made of cast iron, such as haematite, gray cast iron and steel pig which are subjected, when in use, to heat, with said damage being due to breaks, burning out and cracks.

Objects of this kind are used mainly for processing molten steel and are therefore subjected to thermal stresses. This leads to the carbon in these objects separating out. The method described in the invention relates particularly (but not exclusively) to repairs carried out to objects in which the carbon separates off in sheets, because through this a more significant influence on the heat conductivity of the material is obtained for carrying out the method described in the invention. Apart from this, however, the invention can also be used for objects made of so-called spheroidal cast iron in which the carbon separates out in spheroidal form. These objects have a high carbon content, typical for cast iron, of up to a maximum of 4.7 percent and varying silicon contents of between 0.7 percent and about 3.5 percent.

In operation, the most frequent occurrence with the iron molds is that first of all small cracks form which are caused by the heat. However, after the molds have been used for a longer period, more serious damage appears; the inner wall surfaces can break out or become eroded due to the heat in certain places or deeper cracks can form. The same thing can happen to casting plates mentioned above. If damage of this kind occurs, it is no longer possible to use the iron molds for processing molten steel because the steel penetrates into the damaged parts so that after solidification, for example, a steel block can only be removed from an iron mold such as this with very great difficulty.

One object of the invention is to provide a method of repairing such damaged parts so that the objects can then be used again for processing molten steel. Above all, it is, of course, desirable to carry out the repairs as economically as possible. If for example, damage has occurred in only part of the iron mold, while the remaining part is still perfectly good for use, then the part which has sustained damage should be repaired so that it is in practically the same condition as the part which can still be used.

SUMMARY OF THE INVENTION

In accordance with the invention, there is provided a method of repairing damaged parts of iron molds used in steelmaking, or damaged casting plates in iron molds or damaged parts of other objects made of cast iron, such as hematite, gray cast iron and steel pig which are subjected in use to heat, characterized in that first of all impurities adhering to the surface of damaged parts are removed, then, by means of at least one sheathed welding steel electrode, a molten layer of steel is applied to the damaged area, and in that further molten layers are applied on to said first-mentioned layer from current-carrying welding steel electrodes and gray cast iron electrodes, with at least the last layer to be applied being a molten gray cast iron layer from a current-carrying gray cast iron electrode.

In order to illustrate the invention reference is now made to the accompanying drawing which relates to a diagrammatic embodiment by way of example. In the drawings:

BRIEF DESCRIPTION OF THE DRAWING

FIG. 1 is a partial view in perspective of an iron mold with
 a damaged part, while

DETAILED DESCRIPTION OF THE INVENTION

Figure 1:
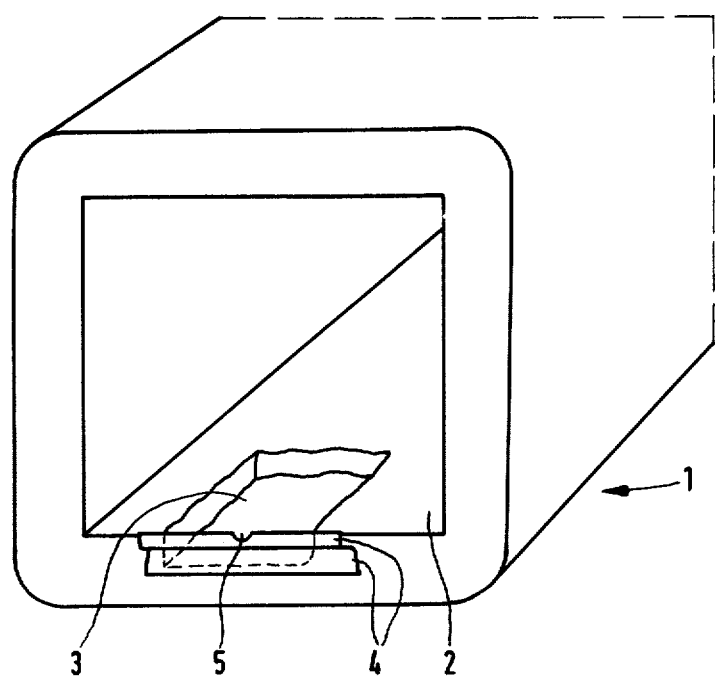

In FIG. 1 an iron mold 1 can be seen and in a wall 2 of the mould there is a damaged part 3 which is several cm. in depth. This damaged part 3 is repaired in accordance with the method of the invention by filling it with a plurality of layers of molten material laid down by current carrying electrodes. Since this damaged part starts from the front wall of the mold said wall is provided with rods 4 which are temporarily fixed thereon and which act as a dam to prevent molten metal from being able to flow out when the damaged part 3 is repaired. The uppermost rod of said rods 4 has, however, an additional notch 5 through which molten slag can flow off when the last welded layer is applied as hereinafter described. The depth of said notch is such that a filling will remain in the damaged section 3 and the top surface of said filling lies in the same plane as the inner surface of the wall 2.

It is, of course, essential to keep the layers, which have to be applied one after the other, completely molten until the following layer has been applied. Through this not only is a gradual change-over from the steel which is applied first, to the gray cast iron which is applied last, brought about but at the same time, in conjunction with the heat conducting property of the gray cast iron which is reduced by the carbon separating off, the iron mold, is heated to a considerable temperature in the area round the damaged part. The result of this heat is that the layer of molten steel which is applied first cools and solidifies so slowly that no martensitic hard parts can form therein. In this way, the stresses and subsequent crack formations caused by changes in the structure remain underneath in the layer described above so that the layer of steel becomes sufficiently strongly joined to the material and/or the iron mold. The strength of this joint is designed to suit the application. Such strength does not mainly depend on the fact that the welded layer which has been applied must take pulling forces or shearing stresses. Instead, only the volume which has been lost in the area of the damaged place has to be renewed. Therefore pores and thermal relief cracks can, for instance, with be allowed in the welded layers which are applied, said cracks usually extending perpendicularly to the plane of the wall and thus not being able to cause the welded layers which have been applied to become detached.

The welded layers which are put on after the first welded layer of molten steel, utilize gray cast iron electrodes as well as current-carrying welding steel electrodes. These gray cast iron electrodes can be used while electrically charged so that the area which is to be kept molten, increases according to the increased total current strength. A gray cast iron electrode can also be used when it has no electric current if one melts it in with the arc of the current-carrying welding steel electrode or, if necessary, it can also be melted in a carbon electrode-arc. If the last layer has to be sintered on, a current-carrying gray cast iron electrode has to be used or a dead gray cast iron electrode has to be melted in a carbon electrode-arc.

In any case, the efficiency of the method is practically doubled if the molten material is applied in layers with the use of two current-carrying welding steel or gray cast iron electrodes respectively, whereby the total welding current strength as well as the size of the area which is to be kept molten is doubled. This variation of the method described by the invention also includes the case if the welder makes the layer which is to be put on first by using two current-carrying welding steel electrodes. The only provision which must be made is that at the place of work in question, the welder must be able to have both hands free in order to guide the electrodes.

It is also within the framework of the present invention to allow large damaged areas to be repaired by several people at once. In this case each of the welders present operates at least one current-carrying welding steel or gray cast iron electrode in such a way that the electrode material is applied in a molten state onto the correspondingly increased area of the welded layer which is to be put on.

In the case of larger damaged areas, it is also possible for the area to be divided up into individual sections which are large enough to be kept molten. The whole damage is repaired, in this instance, successively in sections.

The areas which have to be kept molten are conveniently surrounded, in the case of larger damaged parts, with small pieces of cast iron or steel which can be temporarily fixed. In this way, the smelt which is kept molten is prevented from flowing out of the area.

The last molten layer to be applied consists of excess material which has been melted off from a gray cast iron electrode and this excess material partly flows over the area which is to be kept molten, together with the corresponding oxide slag. If too much molten metal has been applied, the gray cast iron material which has overflowed is removed by mechanical means after it has solidified, that is by grinding or chiselling.

In order to achieve a high efficiency with the above-described process, it is preferable to use welding steel electrodes and gray cast iron rods with considerably larger diameters than the ones usually used. Welding steel electrodes with diameters of 4 to 20 mm are suitable, in particular diameters of 8 to 20 mm, and gray cast iron electrodes with the same diameters should also be used. At the same time, it is preferable if the welding current density, based on the cross-sections of the electrodes, is within a region between 20 to 40 A/mm$^2$.

It is particularly suitable to use as welding steel electrodes, so-called lime-basic encased electrodes which have a carbon content of 0.1 percent, a silicon content of 0.6 percent and a manganese content of 2.0 percent. Rods of the quality GG 22 are particularly suitable as gray cast iron electrodes.

The area of the zone which has to be kept molten on the individual layers is preferably between 30 and 90 cm$^2$ in size, and has a width, of at least about 3 cm. With this width there is still a relation between the periphery and the size of the surface area which enables the desired thermal conditions to be achieved. The volume of the area which is to be kept molten, again based on a total strength of 1,000 amperes of the welding current, is about 150 cm$^3$. Since the damaged parts which are to be repaired are usually deeper in total depth than can be seen from the above-mentioned values of the area and the volume of the material to be kept molten, several layers have to be laid down one after the other so that the first layer, even after solidification, has essentially a steel structure, whereas the last layer always has a pure cast iron structure.

Figure 2:
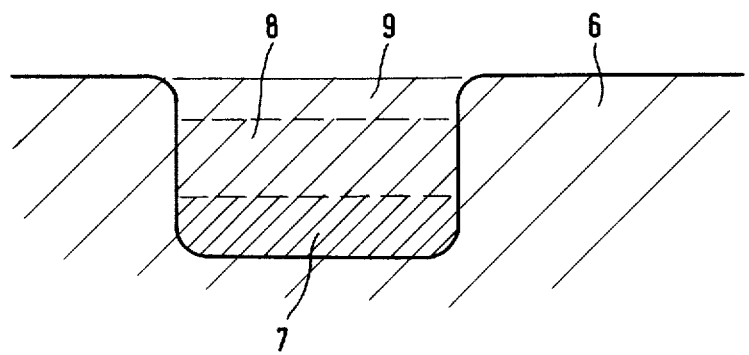
FIG. 2 shows a cross-section in diagrammatic form through
 a damaged part which has been repaired in accordance with the invention.

FIG. 2 shows in diagrammatic form, a cross-section through a damaged part which has been repaired. The original material is indicated by 6. On the bottom of the damaged portion, there is a layer 7 of steel electrodes which has been applied, whereas further layers 8 have been laid on top of this layer, with said layers comprising either molten steel or molten gray cast iron. In the outermost layer 9, however, the structure of the material used for filling is the same as the structure of the original material 6. Furthermore, before the first layer 7 is applied, if there are any impurities adhering to the surface of the damaged part or parts, such impurities are removed in any convenient manner.

The embodiments of the invention in which an exclusive property or privilege is claimed are defined as follows:

1. A method of repairing damaged parts of iron molds used in steelmaking, or damaged casting plates in iron molds or damaged parts of other objects made of cast iron, such as hermatite, gray cast iron and steel pig which are subjected in use to heat, first removing all impurities adhering to the surface of damaged parts, applying by means of at least one sheathed welding steel electrode, a molten layer of steel to the damaged area, and then applying further molten layers onto said first-mentioned layer from current-carrying welding steel electrodes and gray cast iron electrodes, with at least the last layer to be applied being a molten gray cast iron layer from a current-carrying gray cast iron electrode in which a zone of at least cm$^2$ of said molten layer of steel is kept molten by a welding current of at least 1000 amperes.

2. The method as claimed in claim 1, characterized in that each layer of molten material is applied to the damaged parts by using two current-carrying welding steel or gray cast iron electrodes, whereby the total strength of the welding current as well as the size of the area which is to be kept molten is doubled accordingly.

3. The method as claimed claim 1, characterized in that the damaged parts are repaired in individual zones, one after the other.

4. The method as claimed in claim 1, characterized in that the zones which have to be kept molten at any given time are surrounded by small pieces of cast iron or steel, with said pieces being fixed temporarily to the object being repaired.

5. The method as claimed in claim 1, characterized in that when the last layer is applied excess material from the gray cast iron electrodes is melted so that this excess material together with the slag thereof flows from said damaged area being repaired.

6. The method as claimed in claim 5, characterized in that the excess material of the gray cast iron electrodes which flows over is mechanically removed after it has solidified.

7. The method as claimed in claim 1, characterized in that the welding steel electrodes and/or the gray cast iron electrodes are from 8 to 20 mm in diameter, and in that welding is carried out with a density of welding current of 20 to 40 A/cm$^2$, based on the cross-sections of said electrodes.

* * * * *